United States Patent [19]

Thoma

[11] Patent Number: 4,549,154
[45] Date of Patent: Oct. 22, 1985

[54] MAGNETICALLY RETENTIVE PROGRAMMABLE SWITCHING CONTROL DEVICE

[75] Inventor: Friedrich X. Thoma, Haslach, Fed. Rep. of Germany

[73] Assignee: Dieter Graesslin Feinwerktechnik, Fed. Rep. of Germany

[21] Appl. No.: 689,516

[22] Filed: Jan. 9, 1985

Related U.S. Application Data

[63] Continuation of Ser. No. 452,726, Dec. 23, 1982, abandoned.

[30] Foreign Application Priority Data

Dec. 9, 1981 [DE] Fed. Rep. of Germany ....... 3148702

[51] Int. Cl.⁴ .................... H01H 43/00; G05B 19/06; G04C 23/00; G04C 21/00
[52] U.S. Cl. .................... 335/87; 74/568 R; 200/38 FB; 200/38 C; 200/38 D; 335/89; 335/93; 250/200; 368/62; 368/85; 368/184; 368/327
[58] Field of Search .................... 368/62–88, 368/184, 327; 335/59–67, 87, 205–207, 208, 209, 218, 219, 1, 2, 71, 93, 94; 200/38 R–38 DA; 74/568 M, 568 R; 250/200; 307/141.8

[56] References Cited

U.S. PATENT DOCUMENTS

| | | | |
|---|---|---|---|
| 2,536,133 | 1/1951 | Klammer et al. | 307/141.8 |
| 2,601,154 | 6/1952 | Krueger et al. | 200/38 CA |
| 2,690,800 | 10/1954 | Ross | 200/38 C |
| 2,802,079 | 8/1957 | Duffing | 335/93 |
| 2,909,626 | 10/1959 | Enssle | 200/38 CA |
| 3,064,096 | 11/1962 | Bosch | 335/93 |
| 3,287,720 | 11/1966 | Chambers, III et al. | 335/94 X |
| 3,496,788 | 2/1970 | Muntendam | 74/568 R |
| 3,693,119 | 9/1972 | Nakama et al. | 335/59 |
| 3,717,730 | 2/1973 | Utter | 200/38 CA |
| 3,811,019 | 5/1974 | Solari | 200/38 CA |
| 4,109,119 | 8/1978 | Baelz et al. | 200/38 CA X |
| 4,320,384 | 3/1982 | Carlson | 250/200 X |

FOREIGN PATENT DOCUMENTS

| | | |
|---|---|---|
| 2938851 | 4/1981 | Fed. Rep. of Germany . |
| 358609 | 1/1962 | Switzerland . |
| 434365 | 10/1967 | Switzerland . |

*Primary Examiner*—J. R. Scott
*Attorney, Agent, or Firm*—Hill, Van Santen, Steadman & Simpson

[57] ABSTRACT

A switching control device having a plurality of displaceable fingers programmable for controlling a sequence of switching operations in a time-controlled system has a magnetic element for exerting a magnetically retentive force on displaced fingers to hold the displaced fingers in displaced or programmed position, and permitting easy release of a displaced finger upon cancellation of a program so that the finger can return to an unprogrammed neutral position. The fingers may be mounted in a control disc having a permanent magnet or an electromagnet, the control disc functioning as a magnetic yoke, or the fingers themselves may be magnetic.

29 Claims, 14 Drawing Figures

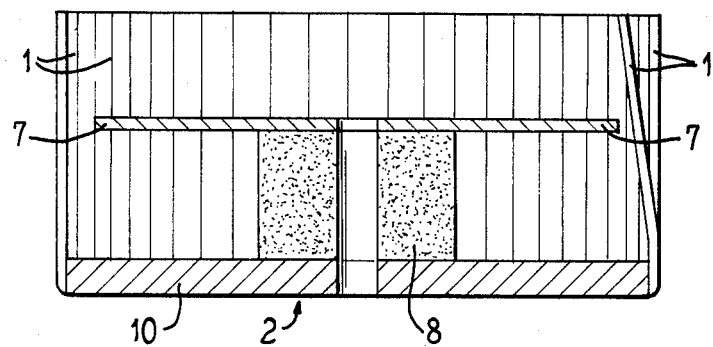
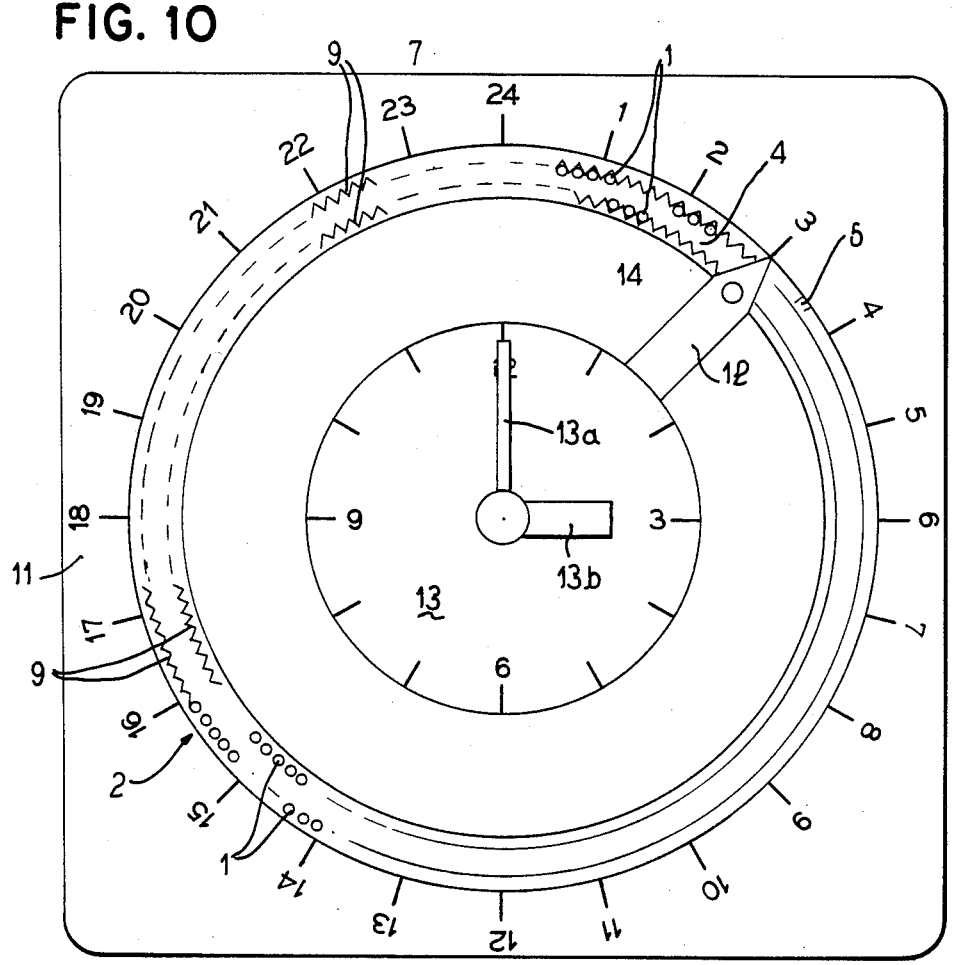
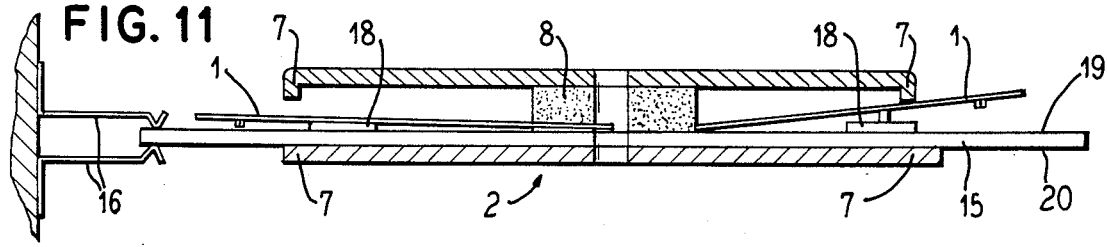

MAGNETICALLY RETENTIVE PROGRAMMABLE SWITCHING CONTROL DEVICE

This is a continuation of application Ser. No. 452,726, filed Dec. 23, 1982 abandoned.

BACKGROUND OF THE INVENTION

1. Field of the Invention

The present invention relates to programmable switching discs of the type utilized in a chronometer for controlling a sequence of operation of a device, and in particular to such a control disc having a magnetic means for releaseably retaining programmed control fingers in a displaced position for actuating a sensing means.

2. Description of the Prior Art

Switching clocks or cycle control timers are widely utilized in switching chronometers which control the operation of a sequence of events in a larger device. Such chronometers sometimes employ a program carrier in the form of a switching or indexing disc to which a plurality of switch riders are connected, the switch riders being displaceable or otherwise programmed for actuating a number of switch means to initiate a particular event in the operational sequence of the controlled device.

Such switching discs with switch riders carried thereon are known in a great variety of different embodiments, but all conventional such switching discs have the general disadvantage that the switch riders are relatively three-dimensionally large and wide. For a switching disc which rotates at one revolution per 24 hours or one revolution per week, it is generally desirable that the switching disc be programmable to initiate events in time divisions of respectively approximately 1 minute per 24 hours or 5 minutes per week. For a switching disc having a diameter of approximately, for example, 60 mm, the wideness of conventional switch riders makes such fineness of time division difficult, if not impossible, and thereby sets a lower limit on the precision of the operating program. The chronological spacing between two successive control instructions is frequently required to lie within the above, heretofore unattainable, values.

SUMMARY OF THE INVENTION

It is an object of the present invention to provide a switching disc for a chronometer programmable in small chronological graduations of the control times and control instructions relative to one another. It is a further object of the present invention to provide such a switching disc which can be easily manufactured and installed.

The above objects are inventively achieved in a switching disc employing a magnetic retaining force for holding a programming element in a programmed position, yet which easily releases the programmed element upon cancellation of the program such that the element returns to a neutral unprogrammed position.

The magnetic retaining force may be exerted by a permanent magnet or an electromagnet disposed in a switching disc, the switching disc having a plurality of radial programming elements or fingers of magnetically susceptible material such that when one or more of the fingers is displaced out of a neutral or unprogrammed position, the displaced finger will be held in the displaced or programmed position by the retaining force.

The switching disc may be in the form of a magnetic yoke for providing the necessary magnetic coupling. Alternatively, the fingers themselves may be comprised of magnetic material.

The width and other dimensions of the fingers, which may be in the form of lamellae or comprised of wire, can be made very small, for example, such fingers may have a width of a tenth of a millimeter.

The control fingers may be removable from the program carrier (switching disc) or may be secured thereto. The fingers may be manually or remotely programmed at their free ends.

In a further embodiment of the invention the program carrier forms two adjacent yoke pieces such that the program element can be displaced on either side of a central neutral position against one of the yoke pieces. A stabilized center position of the control fingers can thus be achieved.

The control fingers may be entirely or partially manufactured of ferromagnetic or low-retentivity material, or may be coated with such material. As stated above, the control fingers may alternatively be magnetized and the switching disc, or at least the yoke pieces thereof, be comprised of material of low-retentivity.

DESCRIPTION OF THE DRAWINGS

FIG. 9 is a sectional view of another embodiment of a control disc constructed in accordance with the principles of the present invention having vertical control fingers.

FIG. 10 is a plan view of a switching disc constructed in accordance with the principles of the present invention in combination with a standard clock face.

FIG. 11 is a sectional view of a control disc constructed in accordance with the principles of the present invention having control fingers for bridging two conductor runs.

DESCRIPTION OF THE PREFERRED EMBODIMENTS

Figure 1:
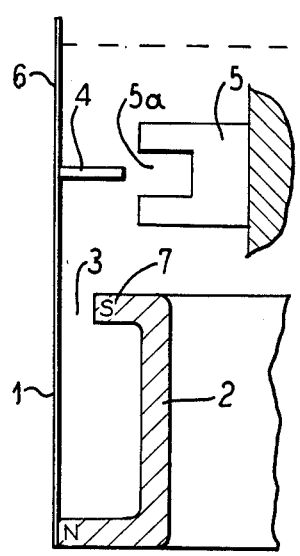
FIG. 1 is a sectional view of a portion of a switching disc and programming finger in a neutral unprogrammed position constructed in accordance with the principles of the present invention.

A portion of a program carrier 2 constructed in accordance with the principles of the present invention having a plurality of flexible programming fingers 1 is shown in FIG. 1. The control finger 1 is shown in FIG. 1 in a neutral or unprogrammed position such that an air gap 3 exists between the carrier 2 and the finger 1.

The control finger 1 may be comprised of ferromagnetic or low-retentivity material, and the program carrier 2 may be comprised of a permanent magnetic material. The program carrier 2, as shown in FIG. 1, may be polarized.

It is also within the inventive concept disclosed and claimed herein that the program carrier 2 be comprised of low-retentivity material and the control finger 1 be magnetized. Other magnetic arrangements may be apparent to those skilled in the art without departing from the inventive concept disclosed herein.

The finger 1 carries a tab 4 at a free end 6 thereof. The tab 4 is movable, upon displacement of the finger 1, into a sensing zone 5a of a stationary sensing means 5. The sensing means 5 may be any type of sensing and switching arrangement well known to those skilled in the art such as an opto-electronic switch (in which case the tab 4 operates as a light barrier) a magnetically controlled switch, an inductive switch, or a mechanical switch. The control finger 1 may be directly or indirectly displaced at its free end to the position shown in FIG. 2, such as by manual movement of the free end 6. The carrier 2 has a magnetic yoke piece 7 for magnetically retaining the displaced control finger 1 in the position shown in FIG. 2, however, the control finger 1 may be easily released and returned to its neutral unprogrammed position as shown in FIG. 1 by again displacing the finger 1 by manual or other means.

Figure 2:
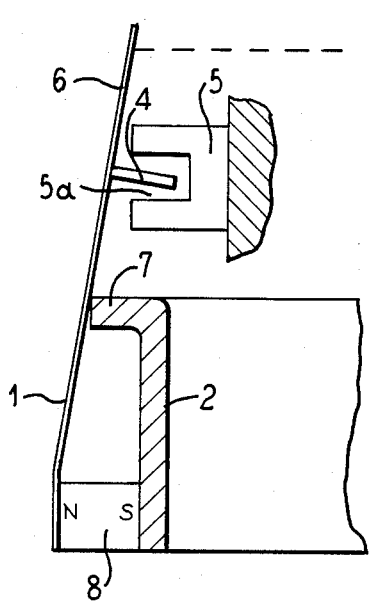
FIG. 2 is a sectional view of a portion of a switching disc and a programming finger constructed in accordance with the principles of the present invention in a programmed position.

In the embodiment shown in FIG. 2 both the program carrier 2 and the control finger 1 consist of low-retentivity material and a permanent magnet 8 is disposed adjacent to the control finger and the program carrier 2 at a fixed end of the finger 1.

Figure 3:
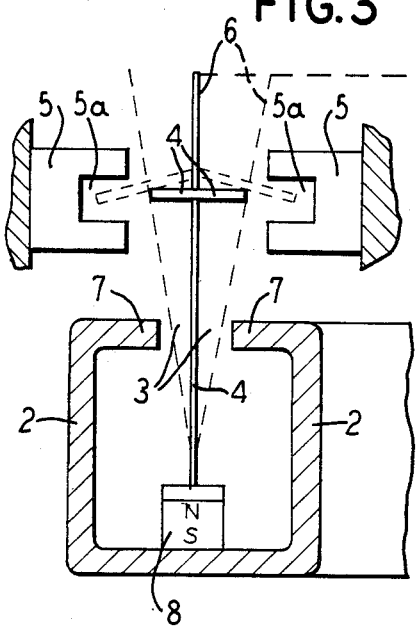
FIG. 3 is a sectional view of a portion of a switching disc and programming finger constructed in accordance with the principles of the present invention in an embodiment permitting two-directional displacement of the finger for programming.

In the embodiment of a program carrier 2 shown in FIG. 3, the carrier has two opposed U-shaped yoke pieces 7 with the control finger 1 disposed therebetween in the air gap 3. The magnetic retaining force is generated by a permanent magnet 8 disposed inside of the yoke, the control finger 1 being mounted on the permanent magnet 8 at one side of the magnet 8 in the area of a pole, with direct magnetic coupling.

As shown in FIG. 3, the control finger 1 may assume one of three functional or control positions. Two of such positions are releaseably magnetically retained while the center position is magnetically neutral. If the control finger 1 is required to exhibit positional stability in the center position, the control finger 1 may consist of a ferromagnetic material having specified spring properties.

The displaced positions of the control finger 1 may operate one of two stationary sensing means 5 disposed opposite each other. For this purpose, the control finger 1 has two oppositely disposed tabs 4.

As the following figures illustrate, the control fingers 1 and the program carrier 2 may be dimensionally designed and combined as needed to meet particular requirements. The device disclosed and claimed herein may be used with a stationary or moving program carrier 2 or a stationary or moving control finger 1. If the program carrier 2 with the control fingers 1 is stationary, the sensing means 5 may be movable. Alternatively the sensing means 5 may be stationary and the program carrier 2 with the control fingers 1 may be movable, such as by rotation.

Figure 4:
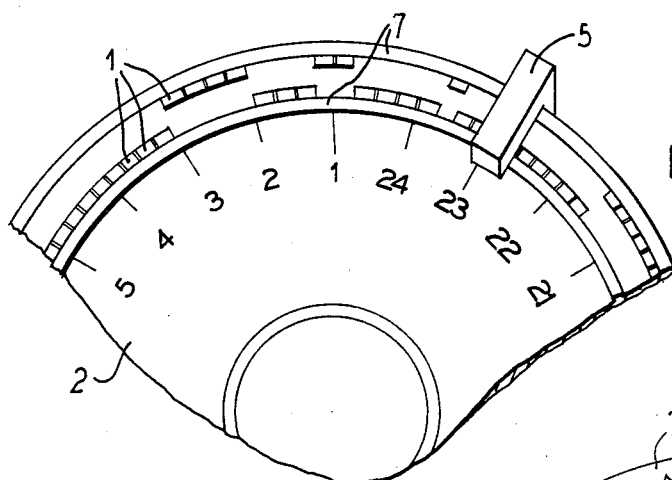
FIG. 4 is a plan view of a portion of a switching disc constructed in accordance with the principles of the present invention having lamellae-like controlled fingers.

A program carrier 2 having control fingers 1 in the form of a rotating control disc is partially shown in FIG. 4, particularly for use in timer switches or program control devices. The program carrier 2 consists of two radially proceeding yoke pieces 7 between which lamellae-like control fingers 1 are disposed in close adjacency with only a small amount of play permitted between the individual control fingers 1. A sensing means 5 is stationarily disposed in the path of travel of the free ends of the control fingers 1. The control fingers 1 in the embodiment shown in FIG. 4 may assume any one of the three positions shown in FIG. 3.

Figure 5:
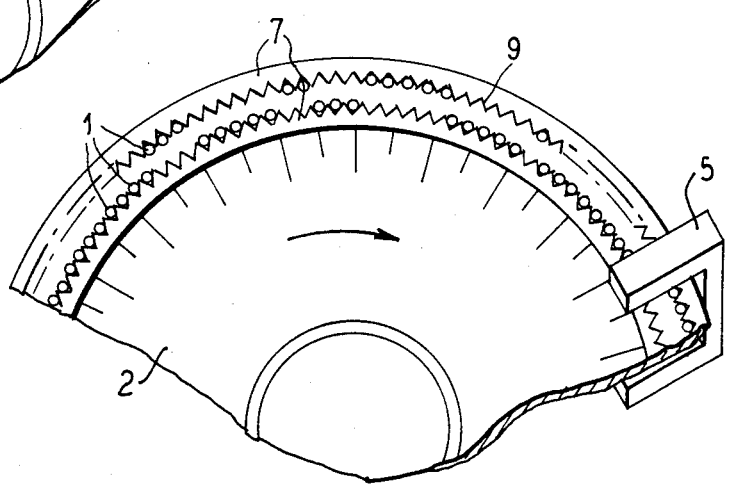
FIG. 5 is a plan view of a portion of a switching disc constructed in accordance with the principles of the present invention having wire programming fingers.

A program carrier 2 is shown in FIG. 5 having a plurality of control fingers 1 which are in the form of wires having a cylindrical cross-section and which are disposed in close proximity to one another with only a slight play relative to one another. In this embodiment the program carrier 2 may also be in the form of a rotating control disc for timer clocks and program control devices. The wire control fingers 1 can exhibit a relatively small cross-section on the order of approximately 0.1 mm and thus permit very small chronologically program graduations, yet still being of a sufficiently large diameter so as to be retainable by the magnetic retaining force. The program carrier 2 may be provided with an interior toothed surface 9 at the circumference of the yoke piece 7 for precisely positioning the control fingers 1, particularly given a small diameter of the control fingers 1. The division of the toothing 9 may correspond to the division of two control fingers 1 relative to one another, the toothing 9 fixing the position of the control fingers 1 at the yoke piece 7.

The program carrier 2 shown in FIG. 5 may, however, be operated without the toothing 9 in which case the programming possibilities are substantially continuous, that is, need not be divided into individual steps. Programming of this fashion cannot be undertaken with conventional non-releaseable switch riders which must assume a specific position relative to a program carrier.

Figure 6:
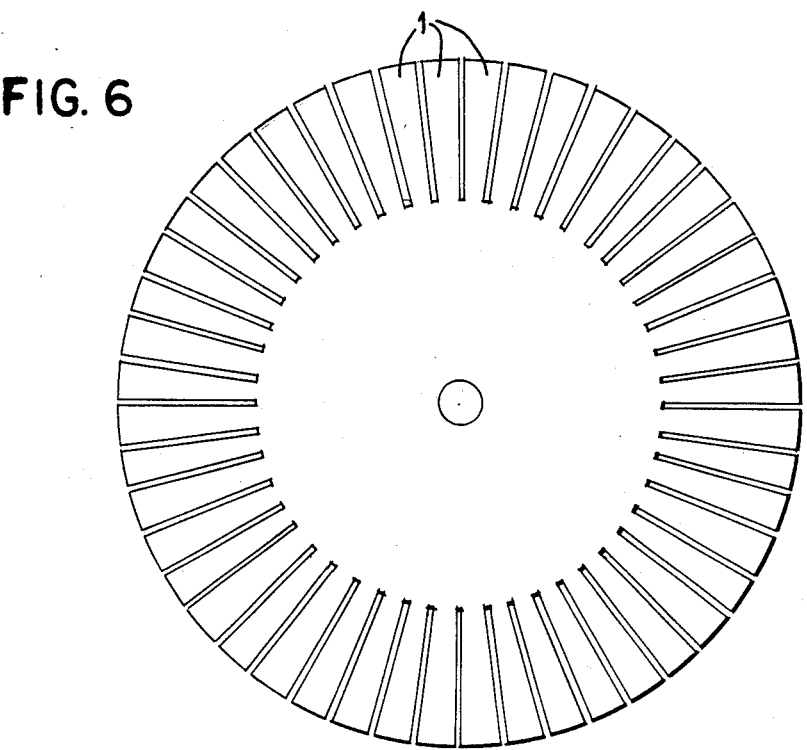
FIG. 6 is a plan view of a one-piece element having radial control fingers thereon for use in the embodiment shown in FIG. 7.
Figure 7:
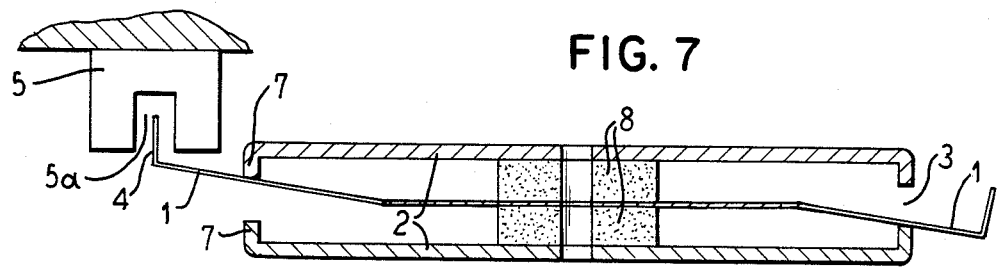
FIG. 7 is a sectional view of a control disc constructed in accordance with the principles of the present invention employing the element shown in FIG. 6.

A further embodiment of the invention is shown in FIGS. 6 and 7 wherein the programming fingers 1 are formed from a one-piece sheet metal disc. The switch fingers 1 may be formed by any suitable method, such as by stamping. The program carrier 2 again has two opposed yoke pieces 7, the yoke pieces 7 encompassing two permanent magnets 8 with the intervening sheet metal disc carrying the control fingers 1 held in a center of the carrier 2. The yoke pieces 7 are separated from one another at the circumference of the program carrier 2 by an air gap 3 which also corresponds to the axial play of the control fingers 1 which limits displacement of the control fingers 1 in conformity with a control program. A stationary sensing means 5 is again shown with a sensing zone 5a into which the tab 4 is movable.

The sheet metal disc shown in FIG. 6 may consist of ferromagnetic, low-retentivity, or permanent magnetic material. If the disc consists of permanent magnetic material the permanent magnets 8 shown in FIG. 7 may be omitted and replaced with a suitable central mounting means for the disc. If the control fingers are manually pushed against the yoke pieces 7, the magnetic retaining forces between permanent-magnetic control fingers 1 and low-retentivity yoke pieces 7 are sufficient, even without a complete magnetic circuit, to secure the functional position of the control fingers 1 relative to the program carrier 2. This feature applies not only to the embodiment shown in FIGS. 6 and 7, but is generally inherent in the inventive concept disclosed herein.

Figure 8:
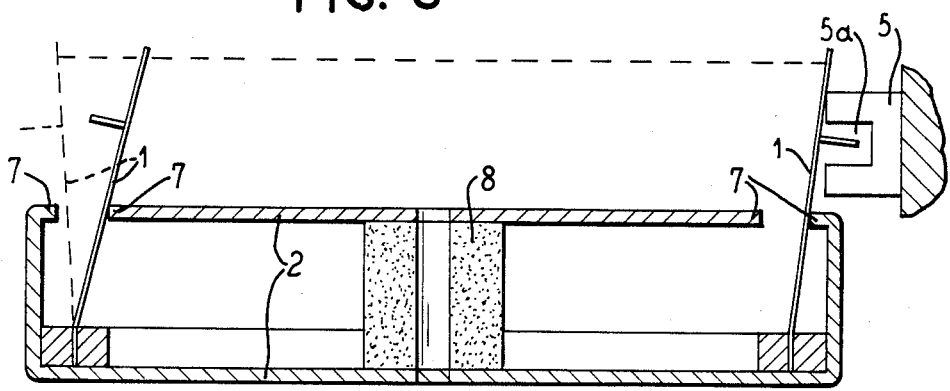
FIG. 8 is a sectional view of a further embodiment of a control disc constructed in accordance with the principles of the present invention having vertical control fingers.

Another embodiment of a program carrier 2 is shown in FIG. 8, wherein the control fingers 1 are disposed in a circular fashion generally coaxially relative to a center axis of the program carrier 2, and proceed vertically with respect to the program carrier 2. The control fingers 1 are again freely movable between two yoke pieces 7 so as to bring the tab of programmed fingers 1 into the sensing zone 5a of a sensing means 5. The program carrier 2 may be rotatably seated and rotationally driven in synchronization with the time of day.

Another embodiment is shown in FIG. 9 having only a single yoke piece 7 and a permanent magnet 8 seated in the center of a bell-like program carrier 2 having generally vertically disposed fingers 1 at a circumference thereof. The program carrier 2 has a base 10 which may consist of a synthetic material having a galvanic coating possessing low-retentivity or general magnetic properties.

FIG. 10 shows an embodiment of a switching disc constructed in accordance with the principles of the present invention in combination with a standard analog clock face and mechanism 13. In this embodiment, the sensing means 5 is rotated around the program carrier 2 by a pointer 12. The control fingers 1 may be wire-like or lamellae-like and are again programmed so as to be held in place against circular yoke pieces 7. If the control fingers 1 are wire-like, the yokes 7 may be provided with toothings 9. The sensing means 5 may sense the presence of tabs 4 of the control fingers 1 opto-electronically, magnetically, or inductively, continuously or in steps.

Because the program carrier 2 (and thus the control fingers 1) are stationary in the embodiment of FIG. 10, the program can be easily read in comparison to the standard clock face 13. The indicator or pointer 12 integrated for operation with the clock face and mechanism 13 may be a 12 hour or 24 hour indicator, in which case a minute hand 13a may be provided for reading the time of day. If the indicator 12 is a 24 hour indicator, a special hour hand 13b may be provided as well. If the sensing means 5 is an opto-electronic sensing means, the light source 14 for the opto-electronics can be made visible at the front of the indicator 12 and thus signal both the operating condition and the function position of the indicator 12. The indicator 12 may also be in the form of a disc, such as a disc having light-transmitting properties, in which case a suitable light source may be stationarily disposed relative thereto.

Figure 12:
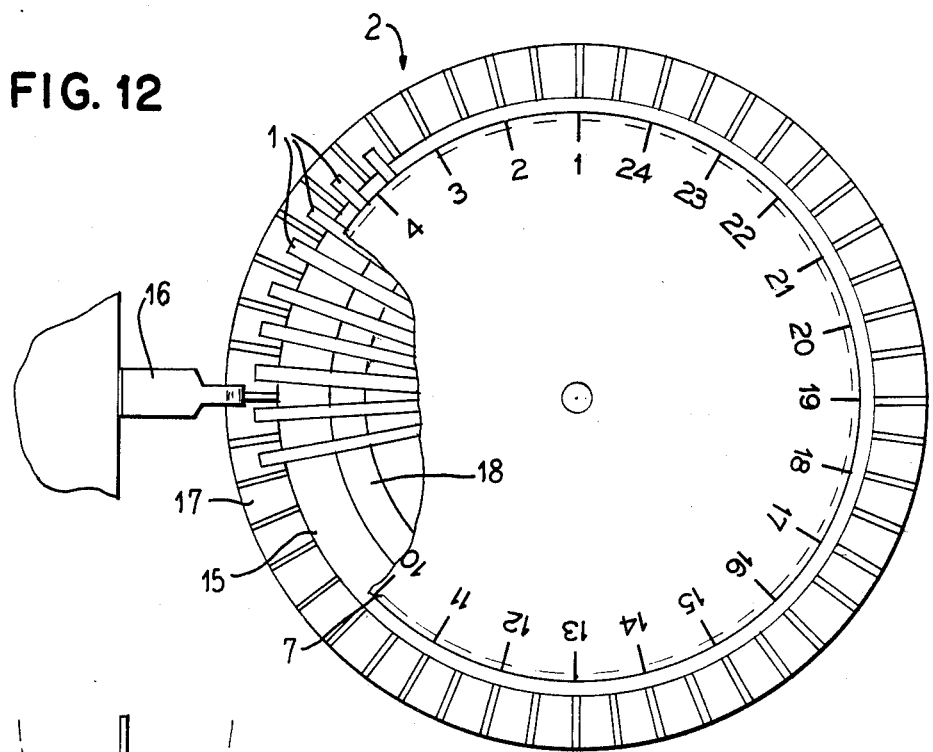
FIG. 12 is a plan view, partially broken away, of the control disc shown in FIG. 11.

A further embodiment of a program carrier 2 constructed in accordance with the principles of the present invention in the form of a control disc is shown in FIG. 11. Again the control fingers 1 are movable between opposed yoke pieces 7. The program carrier 2 further includes an intermediate disc 15 which, as shown in FIG. 12, engages a stationary sensing means 16. The control fingers 1 are in the form of programmable contacts which bridge electrically conducting paths 17 with a conducting ring 18 on the intermediate disc 15.

The embodiment shown in FIGS. 11 and 12 may be further modified so that the intermediate disc 15 has conductors on both its upper side and lower side 20 so as to provide two-directional programming, generally corresponding to the embodiment shown in FIG. 7. A program carrier 2 designed in this manner may be reversible, whereby one side may be provided for programming a weekly program and the other side for programming a daily program. Each of the two sides may have a special acceptance device or engagement means for the particular drive means in order to appropriately correlate the rotational speed with the correct program. Other embodiments described herein may also be made reversible without undue modification.

Figure 13:
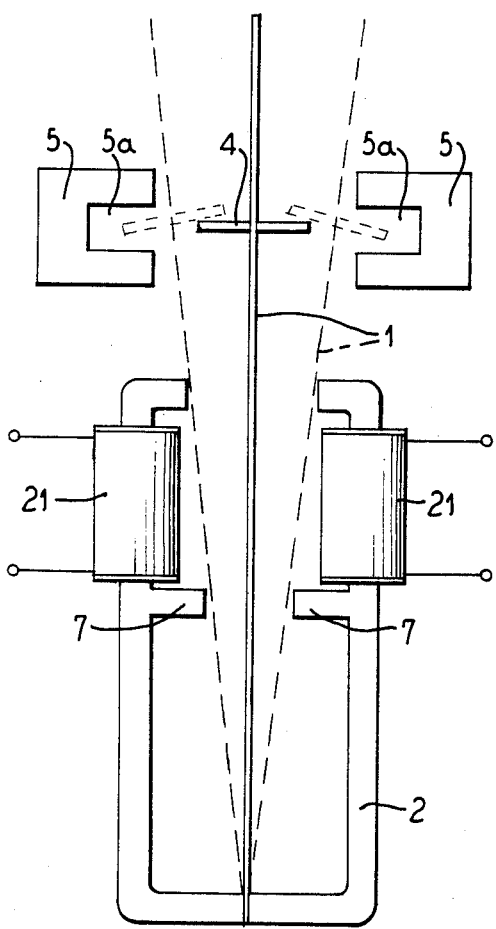
FIG. 13 is a sectional view of a control disc constructed in accordance with the principles of the present invention in an embodiment employing electromagnets.

Another embodiment is shown in FIG. 13 which permits remote programming of the control fingers 1 by a remote programming means 21. The remote programming means may be, for example, an electromagnet system which is stationarily disposed with respect to a rotating program carrier 2, or which may rotate about a stationary program carrier 2 and can be aligned with the control fingers 1 to be programmed for displacing the control fingers 1 in conformity with the control program. The control fingers 1 may also be manually programmed in this embodiment.

Figure 14:
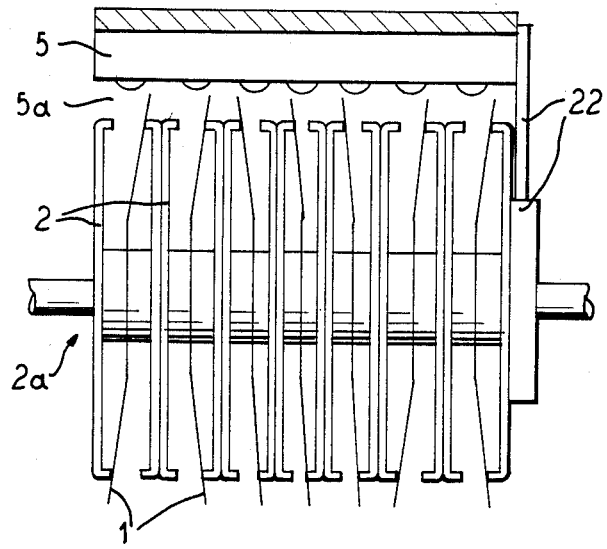
FIG. 14 is a side view of a multi-stage program carrier arrangement having individual stacked program carriers constructed in accordance with the principles of the present invention.

An embodiment of a program carrier 2a comprising a plurality of stacked coaxially disposed program carriers 2 is shown in FIG. 12. Each of the individual program carriers 2 is individually programmable. Such an embodiment is particularly useful for multi-program devices and can be constructed in a compact volume. As shown in FIG. 14, seven program carriers 2 may be disposed coaxially relative to one another so as to form a weekly cycle control timer, wherein each program carrier 2 is allocated to each day. Thus a very high resolution of the programmable stepping times is achieved, even though the program carriers 2 still exhibit a relatively small circumference. A suitably expanded sensing means 5 for mechanically, electrically, or opto-electronically responding to the control fingers 1 is utilized in this embodiment. The sensing means 5 may include a seven day switching system which forwards the switch or control means step-by-step by one program carrier 2 after each full revolution of the program carrier 2a. Alternatively, an electrical/electronic change-over means 22 may be provided which activates the appropriate portion of the sensing means 5 allocated to the proper program carrier 2.

The switching device disclosed and claimed herein thus provides extremely sensitive programming by thin control fingers of wire or in the form of lamellae while still providing a high degree of reliability for the functional positions of the control fingers on the program carrier by means of magnetic retaining forces. The switching device may also be remotely programmed. The dimensions of the program carrier 2 and the control fingers 1 may be selected so as to be compatible with various different types of materials comprising those components.

Although the device disclosed and claimed herein has been described in the context of a switching chronometer, the device has use in any application requiring reliable fine-stepped programming.

Although modifications and changes may be suggested by those skilled in the art it is the intention of the inventor to embody within the patent warranted hereon all changes and modifications as reasonably and properly come within the scope of his contribution to the art.

I claim as my invention:

1. A programmable switching control device for use in combination with a sensing means, said control device comprising:

a program carrier;
      said program carrier having a plurality of outwardly extending control fingers consisting at least in part of ferromagnetic material, said control fingers having movable free ends individually displaceable by a programmer to a position in a sensing zone of said sensing means for actuating said sensing means in accordance with a program; and
   a magnetic means disposed adjacent to said free ends such that at least said free ends are within a magnetic field generated by said magnetic means for magnetically retaining a control finger free end in a displaced programmed position, said control finger being mechanically displaceable away from said magnetic means to a non-programmed position.

2. The control device of claim 1 wherein said control fingers are rigidly fixed relative to said program carrier at a side thereof.

3. The control device of claim 1 wherein said control fingers are lamellae.

4. The control device of claim 1 wherein said control fingers are wire.

5. The control device of claim 1 wherein said control fingers are comprised of ferromagnetic material.

6. The control device of claim 1 wherein said control fingers are coated with ferromagnetic material.

7. The control device of claim 1 wherein said program carrier is comprised of ferromagnetic material.

8. The control device of claim 1 wherein said program carrier is coated with ferromagnetic material.

9. The control device of claim 1 wherein said magnetic means includes at least one yoke piece adjacent said carrier comprised of ferromagnetic material for magnetically holding said control fingers against said yoke piece.

10. The control device of claim 1 wherein said magnetic means includes at least one yoke piece adjacent said carrier coated with ferromagnetic material for magnetically retaining said control fingers against said yoke piece.

11. The control device of claim 1 wherein said program carrier has a toothed interior surface, said control fingers engageable in the teeth of said toothed surface for fixing the position thereof when programmed.

12. The control device of claim 1 wherein said magnetic means is magnetically polarized.

13. The control device of claim 1 wherein said magnetic means is a permanent magnet disposed between said control fingers and said program carrier.

14. The control device of claim 1 wherein said program carrier is a unitary control disk having said control fingers radially extending around a circumference thereof.

15. The control device of claim 14 wherein said sensing means is mounted on a rotatable timer indicator movable in a circle such that said sensing zone moves sequentially past each of said fingers.

16. The control device of claim 1 wherein said control fingers are displaceable and programmable in two directions and wherein said magnet means retains said control fingers after displacement in either of said two directions.

17. The control device of claim 16 wherein said magnetic means comprises a pair of opposed ferromagnetic yoke pieces on opposite sides of said program carrier and a permanent magnet disposed between said yoke pieces, said control fingers extending through a gap between said yoke pieces.

18. The control device of claim 1 wherein said program carrier has a central axis and wherein said control fingers are disposed perpendicular relative to said axis.

19. The control device of claim 1 wherein said program carrier has a central axis and wherein said control fingers are coaxially disposed relative to said axis.

20. The control device of claim 1 wherein said program carrier is rotatable and wherein said control fingers each carry a tab at a free displaceable end thereof, and wherein said sensing means is stationarily disposed with respect to said program carrier such that said tabs move through said sensing zone of said sensing means.

21. The control device of claim 1 wherein said program carrier is stationarily disposed and wherein said control fingers have control tabs disposed at a free displaceable end thereof, and wherein said sensing means is movable relative to said program carriers such that said sensing zone of said sensing means moves past said tabs.

22. The control device of claim 1 wherein said sensing means is an opto-electronic sensing means having a sensing zone formed by a light beam, said light beam being blocked by said fingers in a programmed state.

23. The control device of claim 1 wherein said sensing means is a magnetic sensing means having a magnetic field sensing zone and emitting a signal when one of said programmed fingers is in said magnetic field.

24. The control device of claim 1 wherein said sensing means is an inductive sensing means having an inductive loop sensing zone and emitting a signal when said programmed fingers are in said inductive loop.

25. The control device of claim 1 wherein said control fingers are manually displaceable by said programmer for programming said program carrier.

26. The control device of claim 1 wherein said magnetic means is an electromagnet generating a magnetic field when energized for displacing a finger adjacent thereto.

27. The control device of claim 1 further comprising a plurality of said program carriers coaxially disposed relative to one another and a means for operating said sensing means for sensing one of said program carriers in conformity with a control program.

28. The control device of claim 1 further comprising an electrically conducting means carried at an exterior of said program carrier, a conducting ring on said program carrier, and a pair of contacts carried on each of said control fingers such that a displaced control finger electrically bridges said electrically conducting means and said conducting ring, said electrically conducting means being sensed by said sensing means.

29. The control device of claim 1 wherein said control fingers are removable from said program carrier.

* * * * *